(12) United States Patent
Kwon et al.

(10) Patent No.: US 8,971,947 B2
(45) Date of Patent: Mar. 3, 2015

(54) CONTROL INFORMATION TRANSMISSION AND RECEIVING METHOD FOR GROUP COMMUNICATION IN WIRELESS COMMUNICATION SYSTEM

(75) Inventors: Yeong Hyeon Kwon, Anyang-si (KR); Han Gyu Cho, Anyang-si (KR); Jin Sam Kwak, Anyang-si (KR); Jae Hoon Chung, Anyang-si (KR); Sung Ho Moon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 357 days.

(21) Appl. No.: 13/499,154

(22) PCT Filed: Jun. 15, 2010

(86) PCT No.: PCT/KR2010/003817
§ 371 (c)(1),
(2), (4) Date: Mar. 29, 2012

(87) PCT Pub. No.: WO2011/059156
PCT Pub. Date: May 19, 2011

(65) Prior Publication Data
US 2012/0190394 A1    Jul. 26, 2012

Related U.S. Application Data

(60) Provisional application No. 61/261,357, filed on Nov. 15, 2009.

(51) Int. Cl.
| | |
|---|---|
| *H04W 74/00* | (2009.01) |
| *H04W 84/22* | (2009.01) |
| *H04W 72/00* | (2009.01) |
| *H04W 4/06* | (2009.01) |
| *H04W 8/18* | (2009.01) |
| *H04W 92/18* | (2009.01) |

(52) U.S. Cl.
CPC ............ *H04W 84/22* (2013.01); *H04W 72/005* (2013.01); *H04W 4/06* (2013.01); *H04W 8/186* (2013.01); *H04W 92/18* (2013.01)
USPC .......................................... 455/518; 455/450

(58) Field of Classification Search
CPC ... H04W 4/10; H04W 76/005; H04W 72/005; H04W 28/16
USPC .................................................. 455/518, 519
See application file for complete search history.

(56) References Cited

U.S. PATENT DOCUMENTS

| | | | |
|---|---|---|---|
| 2007/0082690 A1* | 4/2007 | Fabien et al. | 455/518 |
| 2009/0286466 A1 | 11/2009 | Kim et al. | |
| 2009/0290548 A1 | 11/2009 | Lee et al. | |

FOREIGN PATENT DOCUMENTS

| | | |
|---|---|---|
| KR | 10-2008-0005058 A | 1/2008 |
| KR | 10-2008-0018148 A | 2/2008 |

*Primary Examiner* — Tu X Nguyen
(74) *Attorney, Agent, or Firm* — Birch, Stewart, Kolasch & Birch, LLP (57) ABSTRACT

The present invention relates to a method for transmitting and receiving control information for group communications in a wireless communication system. According to one aspect of the present invention, a control information transmission method for group communication in a wireless communication system comprises the steps of, a base station: receiving a group communication request from one or more terminals; determining a plurality of terminals which will perform the group communication; allocating resources which are to be used for performing the group communication; and transmitting information on the plurality of terminals and resource allocation information on the resources which are to be used, to the one or more terminals among the plurality of terminals.

8 Claims, 5 Drawing Sheets

FIG. 5 ered to in the present application.

CONTROL INFORMATION TRANSMISSION AND RECEIVING METHOD FOR GROUP COMMUNICATION IN WIRELESS COMMUNICATION SYSTEM

This application is the National Phase of PCT/KR2010/003817 filed on Jun. 15, 2010, which claims priority under 35 U.S.C. 119(e) to U.S. Provisional Application No. 61/261,357 filed on Nov. 15, 2009, all of which are hereby expressly incorporated by reference into the present application.

TECHNICAL FIELD

The present invention relates to a wireless communication system, and more particularly, to a method of transmitting and receiving control information for a group communication n in a wireless communication system.

BACKGROUND ART

In a cellular system, all communication operations may have optimal performance in aspect of spectral efficiency if performed under the control of a base station. Yet, such an approach corresponds to a use model suitable in aspect of a conventional person-to-person communication or for a case that a sender and an originator are geographically remote from each other. In case that positions of communication peers gather together like a machine communication, in aspect of data transmission and reception of the communication peer, performance of communication between a base station and an individual machine may not be high.

In such a cellular system as 3GPP LTE, IEEE 802.16m and the like, a primary connection target of the system is a person or a limited peer associated with a person. Hence, configuration and operating methods of all systems are designed based on human property, whereby system configuration is optimized within a range of human capability. In particular, configuration of system is designed on the assumption of an appropriate moving speed, an appropriate processing capability and the like.

However, such a human-oriented communication infrastructure has difficulty in accommodating vast machinery therein. For instance, the number peers of machine increases more rapidly than the number of peers of human and processing capability of machine is faster than that of human. Hence, if latency is not set tight like a conventional system, it is impossible to perform a communication. Specifically, in a situation that a lot of peers need to have accesses, since system load increase to accommodate all of them, improvement is necessary. In aspect of system efficiency, system configuration of a different type is necessary as well.

Although inherent throughput of a cellular system or a radio resource using system is very high, some limitation is put on total throughput generated by a network according to a current system configuration. In order to increase throughput of a network, a reuse factor if a radio resource used by the network should be raised. A simplest method of raising the reuse factor is to reduce a size of a cell, which actually costs a lot of money.

DISCLOSURE OF THE INVENTION

Technical Tasks

However, as mentioned in the foregoing description, system performance is lowered in performing a machine communication according to a relayed.

An object of the present invention is to provide a method of transmitting and receiving control information, by which system performance and spectral efficiency can be increased.

Another object of the present invention is to provide a method of transmitting and receiving control information, by which power consumption of a terminal can be reduced.

Technical tasks obtainable from the present invention are non-limited by the above mentioned effect. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, in a base station of a wireless communication system, a method of transmitting control information for a group communication according to one embodiment of the present invention may include the steps of receiving a group communication request from at least one terminal, determining a plurality of terminals to perform the group communication, allocating a resource to use in performing the group communication, and transmitting information on a plurality of the terminals and resource allocation information on the resource to use to at least one of a plurality of the terminals.

In this case, the base station may transmit the resource allocation information via a control channel shared with a plurality of the terminals.

And, the base station may transmit the resource allocation information via a dynamic control message.

To further achieve these and other advantages and in accordance with the purpose of the present invention, in a terminal of a wireless communication system, a method of receiving control information for a group communication according to another embodiment of the present invention may include the steps of making a request for performing a group communication with at least one terminal to a base station, receiving information on a plurality of terminals to perform the group communication together, and receiving resource allocation information on a resource to use in performing the group communication.

In this case, the base station may transmit the resource allocation information to the terminals failing in receiving the resource allocating information from the base station among a plurality of the terminals.

And, the resource may include both an uplink resource and a downlink resource.

To further achieve these and other advantages and in accordance with the purpose of the present invention, a base station according to another embodiment of the present invention may include a receiving module receiving a group communication request from at least one terminal, a processor determining a plurality of terminals to perform the group communication, the processor allocating a resource to use in performing the group communication, and a transmitting module transmitting information on a plurality of the terminals and resource allocation information on the resource to use to at least one of a plurality of the terminals.

To further achieve these and other advantages and in accordance with the purpose of the present invention, a terminal according to another embodiment of the present invention may include a transmitting module making a request for performing a group communication with at least one terminal to a base station and a receiving module receiving information on a plurality of terminals to perform the group communication together and resource allocation information on a resource to use in performing the group communication.

To further achieve these and other advantages and in accordance with the purpose of the present invention, in a base station of a wireless communication system, a method of transmitting control information for a group communication according to another embodiment of the present invention may include the steps of forming a group by binding a plurality of terminals to perform a group communication and simultaneously transmitting the control information to a plurality of the terminals via one resource region.

In this case, a plurality of the terminals may belong to different cells, respectively.

To further achieve these and other advantages and in accordance with the purpose of the present invention, in a terminal of a wireless communication system, a method of receiving control information for a group communication according to a further embodiment of the present invention may include the steps of receiving the control information on a group having the terminal belong thereto from a base station and acquiring control information on the terminal from the control information, wherein the group comprises a set of a plurality of terminals performing the group communication together.

In this case, the terminal may acquire the control information on the terminal from the control information in accordance with a previously defined offset information.

Advantageous Effects

According to embodiments of the present invention, spectral efficiency of a network can be raised and power consumption of a terminal can be reduced.

Effects obtainable from the present invention are non-limited by the above mentioned effect. And, other unmentioned effects can be clearly understood from the following description by those having ordinary skill in the technical field to which the present invention pertains.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP2 802.16 system, they are applicable to other random mobile communication systems except unique features of the 3GPP2 802.16 system.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS) and the like and that a base station is a common name of such a random node of a network stage communicating with a terminal as a node B, an eNode B, a BS and the like.

Figure 1:
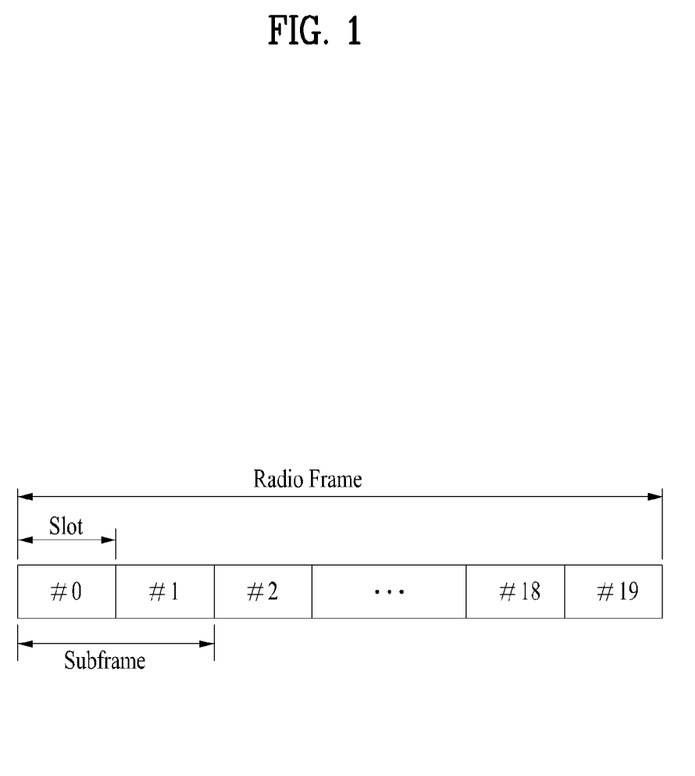
FIG. 1 is a diagram for one example of a frame structure in a wireless communication system.

First of all, a frame structure and a resource structure in a wireless communication system are described with reference to FIG. 1 and FIG. 2 as follows. FIG. 1 is a diagram for one example of a frame structure of a wireless communication system. Referring to FIG. 1, a single frame includes 10 subframes. Each of the subframes includes a pair of slots. A time taken to transmit one subframe is called a transmission time interval (hereinafter abbreviated TTI). For instance, a single subframe may amount to 1 ms and a single slot may amount to 0.5 ms.

One slot includes a plurality of OFDM (orthogonal frequency division multiplexing) symbols. In this case, the OFDM symbol may be called SC-FDMA symbol or symbol duration.

One slot includes 7 or 6 PFDM symbols in accordance with a length of a cyclic prefix (hereinafter abbreviated CP). In a long term evolution (hereinafter abbreviated LTE) system, cyclic prefixes can be classified into a normal CP and an extended CP. In case of using a normal CP, a single slot includes 7 OFDM symbols. In case of using an extended CP, a single slot includes 6 OFDM symbols. And, the extended CP is used in case that a delay spread is large.

Figure 2:
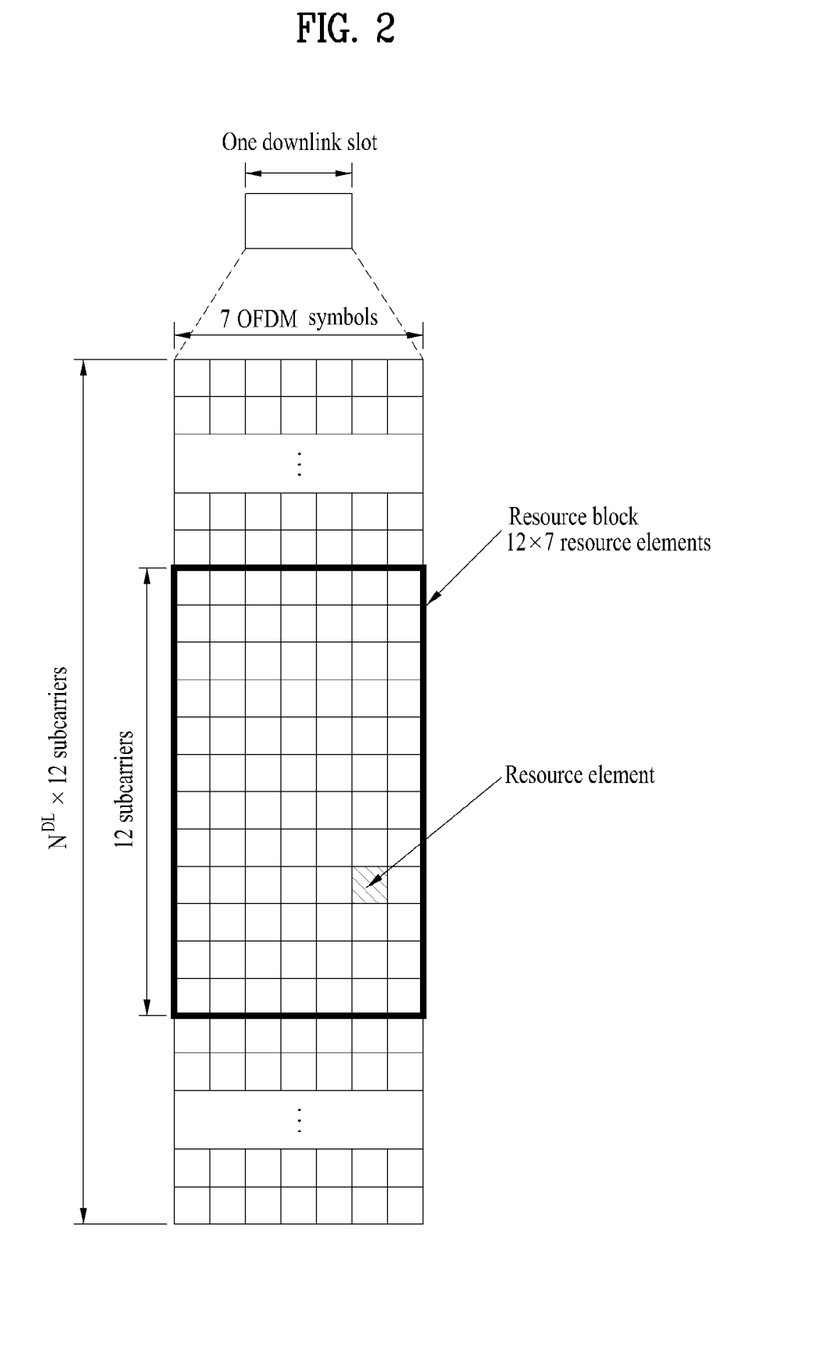
FIG. 2 is a diagram for a resource structure of one downlink slot.

FIG. 2 is a diagram for a resource structure of one downlink slot. FIG. 2 shows a case that a single slot includes 7 OFDM symbols. A resource element (RE) is a resource region constructed with one OFDM symbol and one subcarrier. And, a resource block (RB) is a resource region constructed with a plurality of OFDM symbols and a plurality of subcarriers. For instance, a resource block includes 7 OFDM symbols in time domain while including 12 subcarriers in frequency domain. The number of resource blocks included in one slot may be determined in accordance with a downlink bandwidth.

Figure 3:
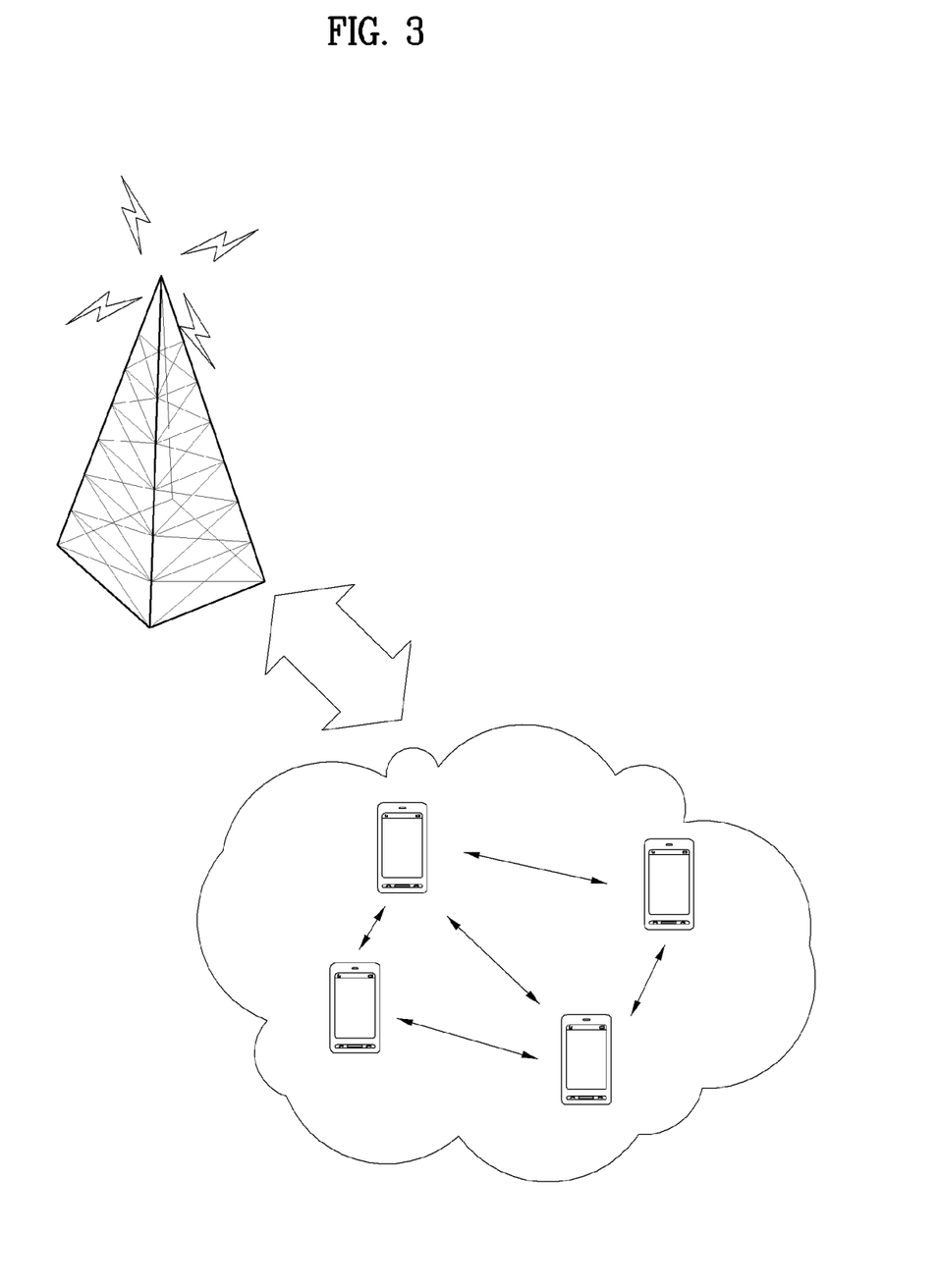
FIG. 3 is a diagram for a group communication according to an embodiment of the present invention.

In the following description, a group communication according to an embodiment of the present invention is explained with reference to FIG. 3. FIG. 3 is a diagram for a group communication according to an embodiment of the present invention.

Referring to FIG. 3, a plurality of terminals form a group, a plurality of the terminals belonging to the group perform communications with each other, and at least one of a plurality of the terminals then communicates with a base station.

When a great quantity of terminals simultaneously gather together, if the terminals perform communications with each other and one, some or all of the terminals then perform communications with a base station, it is more efficient than each of the terminals individually communicates with the base station.

According to an embodiment of the present invention, a plurality of terminals in a cellular network perform terminal-to-terminal communications via a frequency band used by the cellular network.

When a cellular communication network supports a machine communication, it may cause a big problem that the number of people trying to connect at the same time or the number of terminals to be handled in the machine communication increases tens to hundreds times greater than that in a human communication. Due to this problem, resources of a system are wasted, spectral efficiency is lowered, and power consumption of a terminal is raised. This is because all terminals should be connected to a base station and because each terminal should transmit a signal with a power enough to be detected by the base station.

If a group communication according to an embodiment of the present invention is granted, terminals located close to each other communicate without going through a base station. Therefore, power consumption can be reduced, resources can be saved, and spectral efficiency can be raised.

In order to support a group communication, such a function as dynamic resource allocation and group information transmission & reception is necessary. In this case, the dynamic resource allocation is to allocate a resource for the group communication to a group that performs the group communication. If each terminal within a group transceives information with a base station by establishing a connection with the base station, such a structure has a large overhead and considerably power consumption. Hence, the group information transmission & reception is a method for a group to transceive data with base station simultaneously or a method for terminals within a group to communicate with a base station by an optimal scheme.

Figure 4:
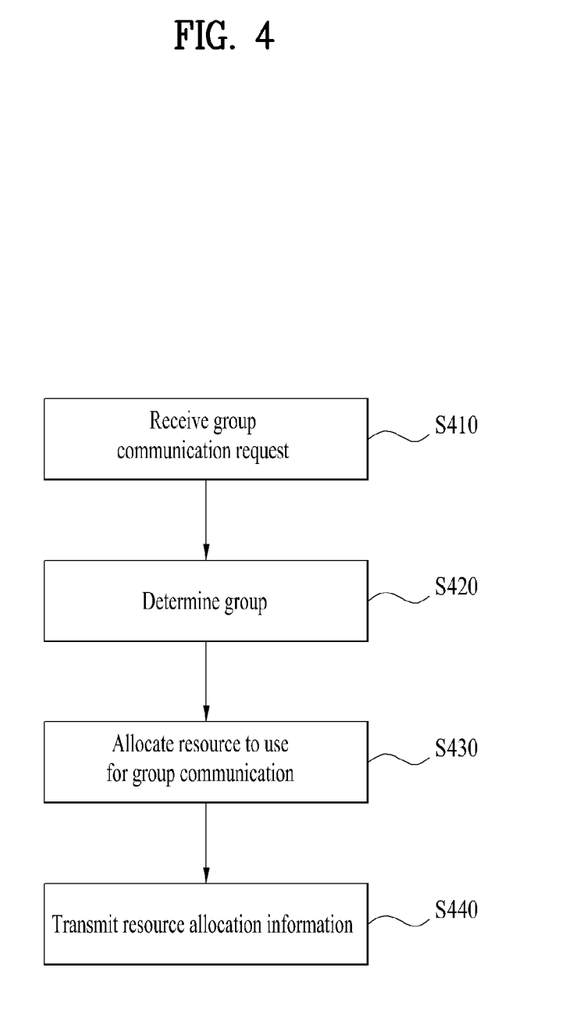
FIG. 4 is a diagram for a dynamic resource allocating method according to an embodiment of the present invention.

In the following description, a dynamic resource allocating method according to an embodiment of the present invention is explained with reference to FIG. 4. FIG. 4 is a diagram for a dynamic resource allocating method according to an embodiment of the present invention.

Referring to FIG. 4, a base station receives a group communication request from at least one terminal [S410]. In doing so, a prescribed terminal may be able to make a request for a group communication while transmitting a list of terminals, with which the prescribed terminal desires to perform the group communication together, to the base station. Alternatively, prescribed terminals among terminals desiring to perform the group communication together requests the group communication or all of the terminals desiring to perform the group communication together may request the group communication.

In case that all of a plurality of terminals request the group communication, channels used by the corresponding terminals may include the same transmission resource. Alternatively, although channels used by a plurality of the terminals include channels different from each other, they may have the structure in which information indicating that the same request is performed is included. For instance, a group communication may be requested in a manner that information on a group is included by indicating a range of a predetermined sequence or delivering a predetermined quantity of control information. Regarding a response to this group communication request, a representative terminal makes a response or several terminals may make responses together through the same transmission resource or associated transmission resources.

The base station determines a group in a manner of selecting a plurality of terminals, which will perform a group communication by belonging to one group, from a plurality of terminals desiring to perform the group communication together [S420]. In this case, the selected terminal is chosen from the terminals desiring to perform the group communication together or may be randomly selected by the base station.

If prescribed terminals are selected from the terminals desiring to perform the group communication together, all of the corresponding terminals should be in active mode.

If terminals are selected based on a reference set by the base station, the base station should set a terminal to join the group communication through such a means for awakening the terminal as a paging information to enable the corresponding terminals to enter the active mode. To this end, the terminal may be able to determine a mode in a manner of discriminating an indication for unicast information directly associated with the terminal itself and an indication for the group communication from each other via the paging information.

The base station allocates a resource to use in performing the group communication [S430] and then transmits information on a plurality of the terminals belonging to one group and resource allocation information to at least one of a plurality of the terminals belonging to the group [S440]. In particular, the corresponding terminal is informed which terminals will perform the group communication together by belonging to the same group of the corresponding terminal.

This information may be notified to the rest of the terminals by the corresponding terminal in a manner of being delivered to a specific terminal only. Preferably, this information may be delivered on a multicast or broadcast channel open to several terminals more effectively. To this end, MBMS channel or MBMS subframe may be utilized. Alternatively, a structure of delivering common information or system information may be available, in which control information is preferably transmitted in a manner of being included in a channel all terminals should search. For example of the channel all terminals should search, there is a common search space of PDCCH in 3GPP.

In doing so, the base station may allocate either an uplink resource or a downlink resource or may allocated both of the uplink resource and the downlink resource. The base station may separately deliver uplink resource allocation information and downlink resource allocation information or may deliver a single control signal structure including both uplink resource allocation information and downlink resource allocation information. To this end, in order for terminals of a group to receive the same control signal, it is preferable to define such a unit as ID of a group unit, which may be usable for control signal identification.

The base station semi-persistently allocates a resource and may be able to control whether the allocated resource will be used by a terminal. In particular, the base station may be able to control a resource via upper signaling or a dynamic control message. In this case, a region of a resource, which will be used by terminals, keeps being used in a resource region semi-persistently allocated by the base station and may have a form of determining whether a corresponding resource will be used or not in accordance with a control command temporarily/permanently instructed by the base station. In this case, the corresponding control command may be delivered in a manner of being included in a portion (e.g., control information delivery via a specific bit or bit group in DCI for another usage) of a different control signal.

A base station may be able to allocate a resource dynamically. In this case, the base station may be able to transmit resource allocation information via upper signaling or a dynamic control message. In case that the resource allocation information is transmitted via upper signaling, a period for a group to validly use a resource may be determined. In case that the resource allocation information is transmitted via the dynamic control message, a valid period of a resource may be transmitted by being included in the dynamic control message or a system may determine a valid period of a resource in advance.

A resource may be persistently allocated in a manner of having a predetermined period or may be persistently allocated in a contiguous time interval.

A base station may transmit resource allocation information to each of terminals of a group individually or may transmit the resource allocation information on a shared control channel simultaneously delivered to the terminals of the group. Alternatively, a base station may transmit resource allocation information to prescribed terminals of the group in part. If so, the rest of the terminals of the group receive the resource allocation information from the prescribed terminals having received the resource allocation information from the base station.

There are two kinds of possible methods for terminals of a group to use an allocated resource as follows. First of all, a $1^{st}$ method is to use an allocated resource by maintaining a conventional communication structure of a cellular system as it is. In particular, if a cellular system uses a communication structure in OFDM structure, terminals use an allocated resource by generating OFDM signal to achieve compatibility with the cellular system.

Secondly, a $2^{nd}$ method is to follow an allocation time rule of a cellular system only without using a communication structure of a cellular system. In this case, a spectrum mask or a guard band is preferably set not to affect a signal managed by another base station.

A communication method to be used by a group is preferably set by a base station in direct. Alternatively, base station may be able to set an operation appropriate for a terminal in consideration of extensibility in the future. In particular, although a terminal selects an operating mode, a base station delivers predetermined information on such a value as a guard band, a guard time and a power level (e.g., allocated band, non-allocated band, etc.) to prevent other terminals to be affected by a presence or non-presence of a signal and the terminal may be able to randomly select a communication model within a corresponding electromagnetic wave operating range.

A terminal may be able to use a resource allocated in a manner of being mapped in uplink or downlink to another terminal by following an uplink or downlink form in aspect of a base station. Alternatively, if an individual adhoc network is configured, it may be unnecessary to discriminate an uplink and a downlink from each other. Alternatively, a terminal may be able to use an allocated resource by changing a direction of uplink or downlink. In particular, a terminal utilizes a downlink of a base station as a uplink and may utilize an uplink of the base station as a downlink. This structure may have a configuration differing for each terminal.

When a terminal utilizes an allocated resource, a predetermined signal structure may be provided within a corresponding resource. For instance, it may be able to provide a structure similar to a structure in which a single subframe in 3GPP LTE includes such a control channel as PCFICH, PHICH, PDCCH, PDSCH, SCH, PBCH and the like. Yet, a portion of the control channel may re-utilize information of a base station. For instance, cell configuration information or operation parameters in a carrier may be obtained from system information received from a base station, a terminal is able to define a communication protocol utilizing a corresponding parameter in an allocated resource, and a corresponding signaling structure may be used in a manner of re-utilizing a portion of a signaling structure used by the base station or generating a new channel within a resource allocated region. If the new channel is generated, its structure may consider being multiplexed in FDM, TDM/FDM or TDM form with another channel generated by a terminal.

When terminals utilize an allocated resource, a prescribed one of the terminals may play a role as a coordinator or mini base station in utilizing resources. In this case, the rest of the terminals generates and transmits signals to correspond to a signal structure of the prescribed terminal.

In the following description, a group information transmitting and receiving method according to an embodiment of the present invention is explained as follows.

First of all, in order for a cellular network to support a great quantity of terminals, a scheme of reducing overhead is required for handling the terminals. Hence, according to an embodiment of the present invention, a group is formed by binding a plurality of terminals together and a base station transmits and receives data and control information by a group unit.

A group may be constructed with terminals belonging to one cell or terminals belonging to another cell. Alternatively, a group may be configured with terminals belonging to different networks by integrating them together.

A control signal and a data signal for the constructed or configured group are transmittable via a radio interface or only or may be transmitted together via a wire network. For instance, in case that a mobile phone connected with a base station by wireless and a computer connected with a network by wire are included in a group, the mobile phone may receive data and control signals from the base station by wireless and the computer may receive data and control signals via a wired network.

Terminals of a group receive signals via a message corresponding to a group, to which they belong, from a base station or a control entity. If information on a resource region allocated to each of the terminals is transmitted by being included in a control signal transmitted by the base station, the corresponding terminal may be aware of the resource region allocated to the terminal itself via the control signal and may be able to receive data via the corresponding resource region. Alternatively, the terminal may be implicitly aware of the region allocated to the terminal itself. In particular, as a resource allocation order or offset for each of the terminals is determined, the corresponding terminal receives data via the resource region corresponding to its order in the allocated resource region.

When terminals of a group receive data or control information from a base station by wireless, they receive the data or control information via an ID of the group. In this case, channel mapping, channel multiplexing, channel coding and channel structure schemes of the data or the control information may be equal to those of the data or control information delivered to a single terminal.

When the terminals of the group deliver acknowledgement/non-acknowledgement (hereinafter abbreviated ACK/NACK) for the received control information or data, they share the same control channel to use or may be able to select and use different channels according to a predetermined rule, respectively.

In case that the same control channel is shared, a plurality of ACK/ACK are cumulated and transmitted or elements configuring the corresponding control channel divided and carry the ACK/NACK, respectively. In doing so, like MU-MIMO, a structure, to which a sort of MIMO operation is applied, may be provided to deliver ACK/NACK via different spatial channels. In this case, an MIMO operation applied part may be usable in a manner that an information part and a pilot part are defined for different operations, respectively.

In case of using different channels, each of the terminals transmits the control information via an independently allocate resource.

When a group receives uplink resource allocation information from a base station, it should determine a resource available for the group itself. In this case, a position of the resource may be designated to the same resource of another terminal or may have a structure in which al terminals use the same resource. When terminals share the same resource, they perform an operation similar to that of MU-MIMO and an MIMO operation may be differently applied to an information part or a pilot part. Alternatively, it may have a structure in which information is simply transmitted in the same form of overlaid channel coding.

If a resource used by a terminal is independently designated, data may be transmitted by a previously defined transmission scheme within the corresponding resource. In this case, the transmission scheme may be defined in advance via upper signaling or scheduling information.

Each of the terminals of the group separately measures and feeds back a channel and may be able to separately transmit a sounding signal.

Alternatively, in order to reduce feedback overhead, only one terminal or prescribed terminals of the group may be able to measure and feed back a channel. In doing so, other entities may not perform reports or may perform reports in predetermined order.

And, in order to reduce sounding overhead, only one terminal or prescribed terminals of the group may be able to transmit a sounding signal. In doing so, other entities may not transmit sounding signals or may transmit sounding signals in predetermined order in accordance with time.

A group based communication may be utilized in the course of a communication between a base station and a group or may be utilized for a base station to perform resource allocation on a group. And, a group based communication may be utilized for terminals within a group to perform communications in-between via an allocated resource.

Figure 5:
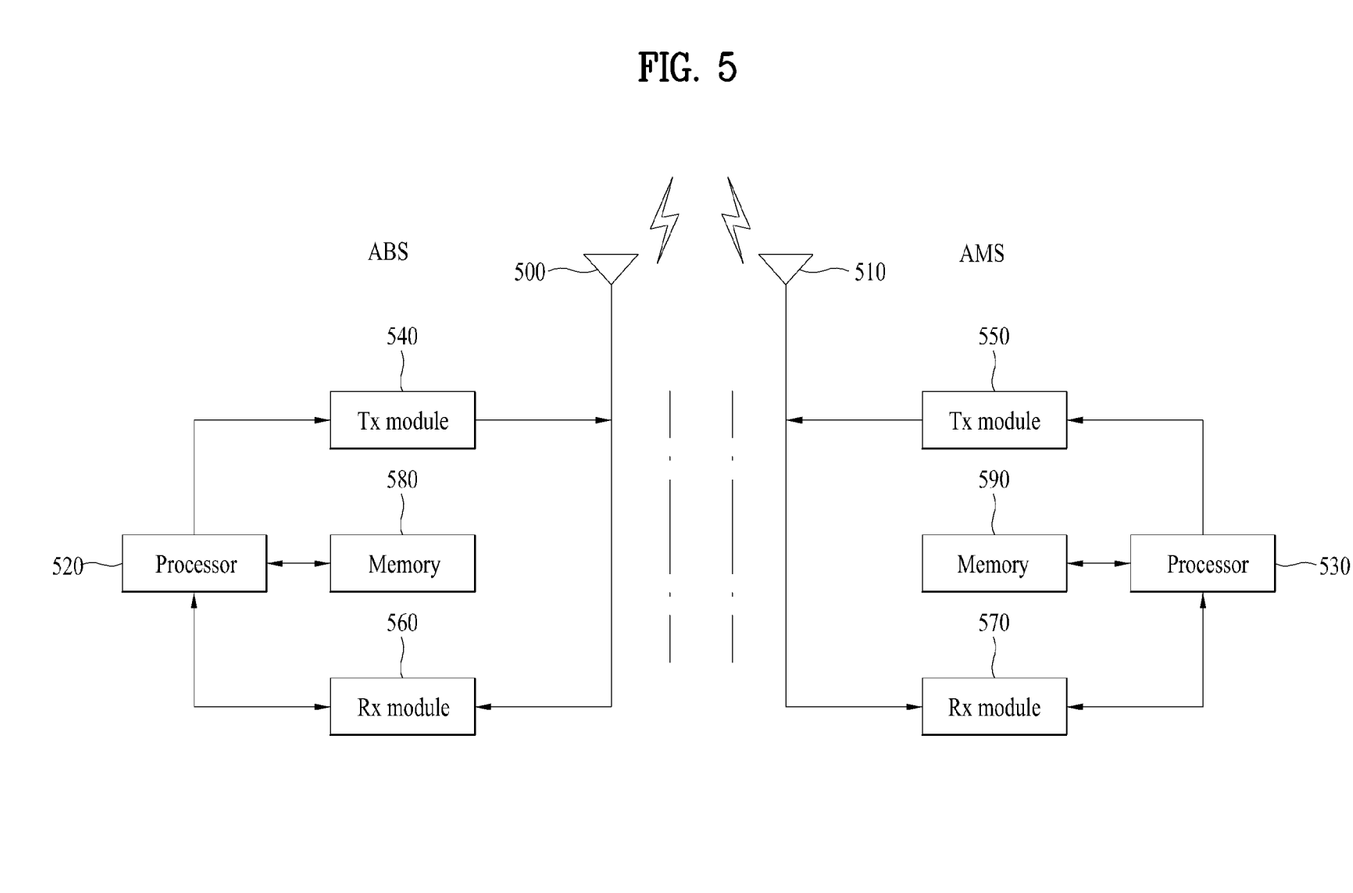
FIG. 5 is a diagram for a configuration of a mobile station and a mobile base station according to another embodiment of the present invention to implement embodiments of the present invention.

FIG. 5 is a diagram for a configuration of a mobile station and a mobile base station according to another embodiment of the present invention to implement embodiments of the present invention.

Referring to FIG. 5, a mobile station/base station (AMS/ABS) includes an antenna 500/510 capable of transmitting and receiving information, data, signals, messages and/or the like, a transmitting module (Tx module) 540/550 transmitting a message by controlling the antenna, a receiving module (Rx module) 560/570 receiving a message by controlling the antenna, a memory 580/590 storing informations associated with a communication with a base station, and a processor 520/530 controlling the transmitting module, the receiving module and the memory. In this case, the base station may include a femto base station or a macro base station.

The antenna 500/510 externally transmits a signal generated from the transmitting module 540/550. And, the antenna 500/510 receives a radio signal from outside and then forwards the received radio signal to the receiving module 560/570. In case that a multi-antenna (MIMO) function is supported, at least two antennas can be provided to the mobile/base station.

The processor 520/530 generally controls overall operations of the mobile/base station. In particular, the processor 520/530 is able to perform a control function for performing the above-described embodiments of the present invention, a MAC (medium access control) frame variable control function according to service characteristics and propagation environment, a handover function, an authentication function, an encryption function and the like. And, the processor 520/530 may further include an encryption module configured to encrypt various messages and a timer module configured to control transmission and reception of the various messages.

The processor 520 of the base station determines a group by selecting a plurality of mobile stations to perform a group communication by belonging to one group from mobile stations desiring to perform the group communication together. The processor 520 of the base station allocates a resource to use in performing the group communication. In doing so, the processor 520 of the base station allocates either an uplink resource or a downlink resource or may allocated both of the uplink resource and the downlink resource.

The processor 530 of the mobile station may use the resource allocated by the base station by maintaining a conventional communication structure of a cellular system as it is. In particular, if the cellular system uses a communication method in an OFDM structure, each mobile station uses the allocated resource by generating an OFDM signal in a manner of achieving compatibility with the cellular system. Alternatively, the processor 530 of the mobile station may follow an allocation time rule of the cellular system without using the communication structure of the cellular system.

The transmitting module 540/550 performs prescribed coding and modulation on a signal and/or data, which is scheduled by the processor and will be then transmitted externally, and is then able to forward the coded and modulated signal and/or data to the antenna 500/510.

The transmitting module 550 of the mobile station sends a group communication request message to the base station. Subsequently, the transmitting module 540 of the base station transmits information on a plurality of mobile stations belonging to one group and resource allocation information to at least one of a plurality of the mobile stations belonging to the group.

The receiving module 560/570 reconstructs the radio signal received externally via the antenna 500/510 into original data in a manner of performing decoding and demodulation on the received radio signal and is then able to forward the reconstructed original data to the processor 520/530.

The receiving module 560 of the base station receives the group communication request from at least one mobile station. Subsequently, the receiving module 570 of the mobile station receives information on a plurality of mobile stations to perform the group communication together and resource allocation information on a resource to be used in performing the group communication from the base station.

The memory 580/590 may store programs for processing and control of the processor and is able to perform a function of temporarily storing input/output data (e.g., in case of the mobile station, UL grant allocated by the base station, system information, station identifier (STID), a flow identifier (FID), an action time, region allocation information, frame offset information, etc.).

And, the memory 580/590 may include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforesaid embodiments of the present invention can be used by those skilled in the art in a manner of being combined with one another.

Therefore, the present invention is non-limited by the embodiments disclosed herein but intends to give a broadest scope matching the principles and new features disclosed herein.

What is claimed is:

1. In a terminal of a wireless communication system, a method of receiving control information for a group communication, the method comprising:
    making a request for performing a group communication with at least one terminal to a base station;
    receiving information on a plurality of terminals to perform the group communication together;
    receiving resource allocation information on a resource to use in performing the group communication via a control channel shared with the plurality of terminals or individually; and
    when the resource allocation information is transmitted via the control channel shared with the plurality of terminals, transmitting the resource allocation information to the terminals failing in receiving the resource allocating information from the base station among the plurality of terminals.

2. The method of claim 1, further comprising determining resources for performing the group communication based on the resource allocation information;
    when the determined resources correspond to shared resources with the plurality of terminals, transmitting a plurality of accumulated acknowledgement/non-acknowledgments (ACK/NACKs); and
    when the determined resources correspond to individual resources, transmitting an ACK/NACK using an individual resource separately.

3. The method of claim 1, wherein the resource comprises both an uplink resource and a downlink resource.

4. A terminal comprising:
    a processor configured to control a transmitting module;
    the transmitting module configured to make a request for performing a group communication with at least one terminal to a base station; and
    a receiving module configured to receive information on a plurality of terminals to perform the group communication together and resource allocation information on a resource to use in performing the group communication via a control channel shared with the plurality of terminals or individually,
    wherein, when the resource allocation information is transmitted via the control channel shared with the plurality of terminals, the transmitting module transmits the resource allocation information to the terminals failing in receiving the resource allocating information from the base station among the plurality of terminals.

5. The terminal of claim 4, wherein:
    the processor determines resources for performing the group communication based on the resource allocation information,
    when the determined resources correspond to shared resources with a plurality of the terminals, the transmitting module transmits a plurality of accumulated acknowledgement/non-acknowledgments (ACK/NACKs),
    when the determined resources correspond to individual resources, the transmitting module transmits an ACK/NACK using an individual resource separately.

6. The terminal of claim 4, wherein the resource comprises both an uplink resource and a downlink resource.

7. In a terminal of a wireless communication system, a method of receiving control information for a group communication, the method comprising:
    receiving the control information on a group having the terminal belong thereto from a base station, wherein the group comprises a set of a plurality of terminals performing the group communication together;
    acquiring control information on the terminal from the control information; and
    when the control information is transmitted via the control channel shared with the plurality of terminals, transmitting the control information to the terminals failing in receiving the control information from the base station among the plurality of terminals.

8. The method of claim 7, wherein the step of acquiring the control information on the terminal comprises the step of acquiring the control information on the terminal from the control information in accordance with a previously defined offset information.

* * * * *